(12) United States Patent
Imai

(10) Patent No.: US 7,426,748 B2
(45) Date of Patent: Sep. 16, 2008

(54) MANAGEMENT MEDIATING DEVICE, IMAGE PROCESSING APPARATUS, MANAGEMENT MEDIATING PROGRAM, AND STORING MEDIUM STORING MANAGEMENT MEDIATING PROGRAM

(75) Inventor: Tatsuya Imai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 663 days.

(21) Appl. No.: 10/667,306

(22) Filed: Sep. 23, 2003

(65) Prior Publication Data

US 2004/0139188 A1 Jul. 15, 2004

(30) Foreign Application Priority Data

| Sep. 24, 2002 | (JP) | 2002-276574 |
| Mar. 26, 2003 | (JP) | 2003-084669 |
| Sep. 11, 2003 | (JP) | 2003-320288 |

(51) Int. Cl.
  G06F 9/00 (2006.01)
  G06F 15/16 (2006.01)
  H04L 9/32 (2006.01)
  H04L 9/00 (2006.01)

(52) U.S. Cl. ............ 726/11; 726/12; 726/13; 726/14; 726/15; 713/151; 713/152; 713/153; 709/223; 709/224; 709/225; 709/226; 709/227; 710/15; 710/16; 710/17; 710/18

(58) Field of Classification Search ............ 726/11
See application file for complete search history.

(56) References Cited

U.S. PATENT DOCUMENTS

| 6,424,429 B1 * | 7/2002 | Takahashi et al. ......... 358/1.16 |
| 6,535,716 B1 * | 3/2003 | Reichman et al. .......... 455/12.1 |
| 6,859,832 B1 * | 2/2005 | Gecht et al. ................ 709/224 |
| 2001/0056485 A1 * | 12/2001 | Barrett et al. ............... 709/224 |
| 2002/0059176 A1 * | 5/2002 | Fujisawa ....................... 707/1 |
| 2002/0194307 A1 * | 12/2002 | Anderson et al. ........... 709/219 |
| 2004/0139188 A1 | 7/2004 | Imai |

FOREIGN PATENT DOCUMENTS

WO    WO 02/33532 A2    4/2002

OTHER PUBLICATIONS

U.S. Appl. No. 10/896,900, filed Jul. 23, 2004, Imai.
U.S. Appl. No. 10/667,306, filed Sep. 23, 2003, Imai.
U.S. Appl. No. 10/810,696, filed Mar. 29, 2004, Nasu.
U.S. Appl. No. 10/366,610, filed Feb. 14, 2003, Imai.
U.S. Appl. No. 10/392,861, filed Mar. 21, 2003, Saitoh.
D. Levi, et al., "Definitions of Managed Objects for Scheduling Management Operation", URL: http://www.faqs.org/rfc/pdf/rfc2591.txt.pdf>, 'Online!, Internet Society, XP-002366789, May 1999, pp. 1-25.

* cited by examiner

Primary Examiner—Longbit Chai
(74) Attorney, Agent, or Firm—Oblon, Spivak, McClelland, Maier & Neustadt, P.C.

(57) ABSTRACT

A management mediating device includes a management system communication device for making a connection to a management system outside a fire wall from inside the fire wall, and receiving a command from the management system, and a processor for performing a process in accordance with the received command. The management mediating device further includes a management object system communication device for transferring the command to a management object system, a storage for storing a connection schedule of the management system communication device, and an instructing device for, in accordance with the connection schedule, instructing the management system communication device to make a connection to the management system.

21 Claims, 15 Drawing Sheets

FIG.3A

| ID | START DATE AND TIME | END DATE AND TIME | INTERVAL |
|---|---|---|---|
| 23 | YEAR:02,MONTH:4,DAY:1,HOUR:0,MUNITE:0,SECOND:0 | ------ | ------ |
| 13 | YEAR:*,MONTH:*,DAY:*,HOUR:0,MUNITE:0,SECOND:0 | ------ | ------ |
| 11 | YEAR:02,MONTH:*,DAY:25,HOUR:0,MUNITE:0,SECOND:0 | ------ | ------ |

FIG.3B

| ID | START DATE AND TIME | END DATE AND TIME | INTERVAL |
|---|---|---|---|
| 23 | YEAR:02,MONTH:4,DAY:1,HOUR:0,MUNITE:0,SECOND:0 | YEAR:03,MONTH:4,DAY:1,HOUR:0,MUNITE:0,SECOND:0 | 1 HOUR |

FIG.3C

| ID | START DATE AND TIME | END DATE AND TIME | INTERVAL |
|---|---|---|---|
| 23 | YEAR:*,MONTH:*,DAY:*,HOUR:14,MUNITE:0,SECOND:0 | YEAR:*,MONTH:*,DAY:*,HOUR:18,MUNITE:0,SECOND:0 | 30 MINITES |

FIG.3D

| ID | START DATE AND TIME | END DATE AND TIME | INTERVAL |
|---|---|---|---|
| 23 | YEAR:02,MONTH:4,DAY:1,HOUR:0,MUNITE:0,SECOND:0 | ------ | 3 HOURS |

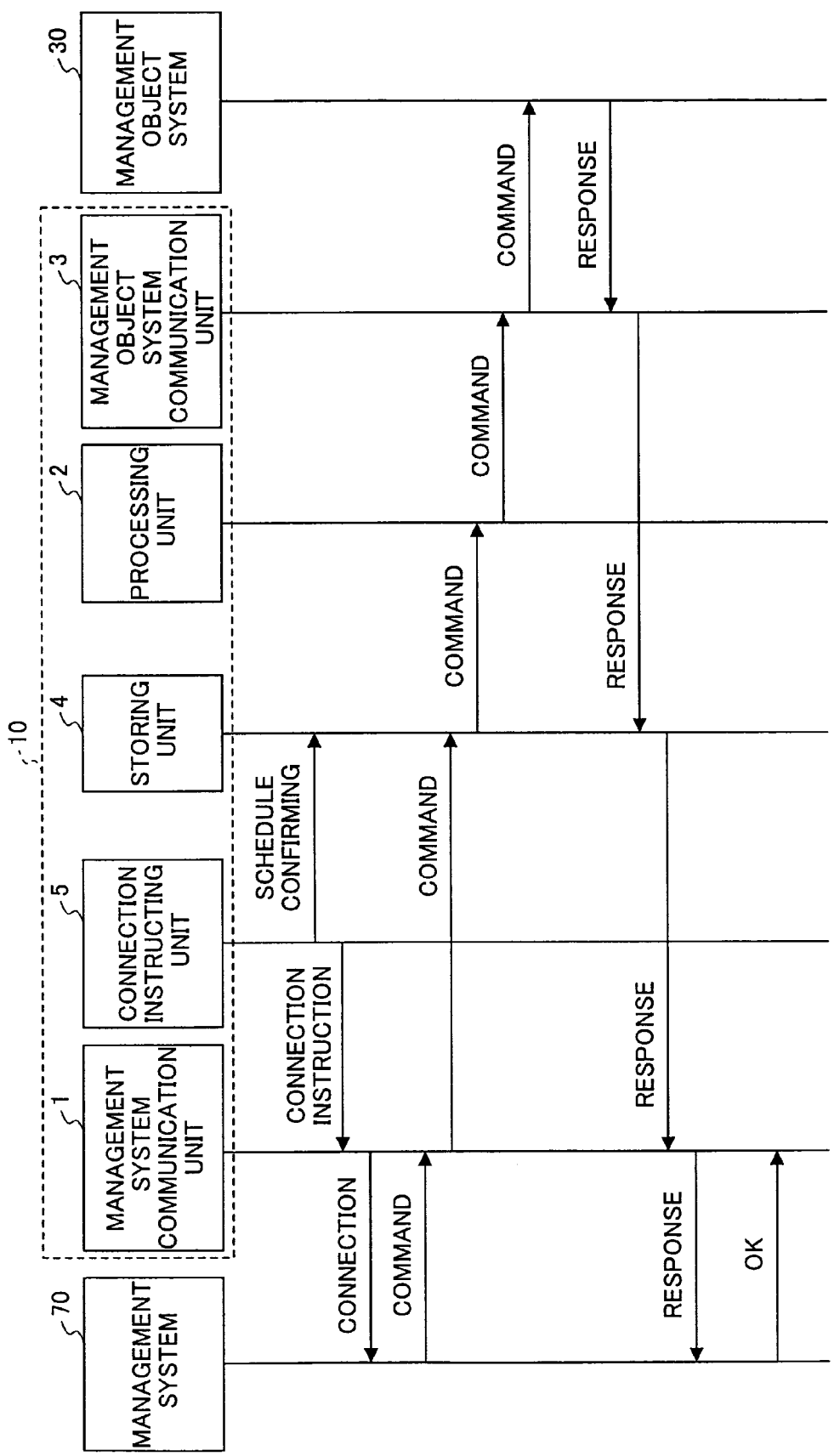

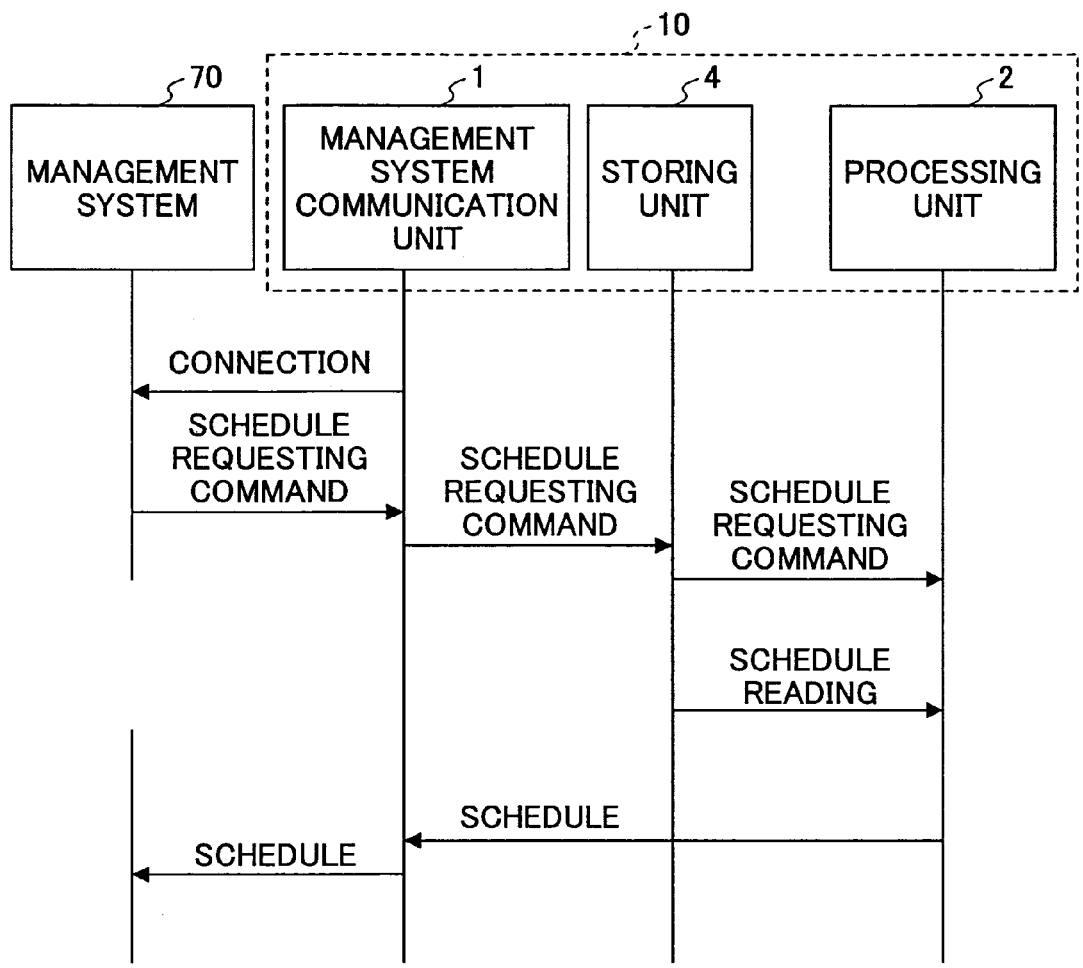

FIG.9

| COMMAND FORMAT | setSchedule(URL WHERE NEW CONNECTION SCHEDULE EXISTS) |
|---|---|

EXAMPLE OF RESPONSE MESSAGE:

```
HTTP/1.1 200 OK
Content-Type: application/soap+xml; charset="utf-8"
Content-Length: nnnn <?xml version="1.0"?>
<env:Envelope xmlns:env="http://www.w3.org/2001/12/soap-envelope">
  <env:Header>
    <m:targetDevice xmlns:m="http://controlerDevice.org/controler"
                    env:mustUnderstand="true">
      terminal1234
    </m/:targetDevice>
  </env:Header>
  <env:Body>
    <m:setSchedule
        env:encodingStyle="http://www.w3.org/2001/12/soap-encoding"
        xmlns:m="http://controlerDevice.org/controler">
      <sourceURL>http://controlerDevice.org/storage/schedule1.dat</sourceURL>
    </m:setSchedule>
  </env:Body>
</env:Envelope>
```

FIG.10

| COMMAND FORMAT | addSchedule(UNIT SCHEDULE DATA) |
|---|---|
| EXAMPLE OF RESPONSE MESSAGE | HTTP/1.1 200 OK<br>Content-Type: application/soap+xml; charset="utf-8"<br>Content-Length: nnnn<br><br><?xml version="1.0"?><br><env:Envelope xmlns:env="http://www.w3.org/2001/12/soap-envelope"><br> <env:Header><br>  <m:targetDevice xmlns:m="http://controlerDevice.org/controler"<br>    env:mustUnderstand="true"><br>   terminal1234<br>  </m:/targetDevice><br> </env:Header><br> <env:Body><br>  <m:addSchedule env:encodingStyle="http://www.w3.org/2001/12/soap-encoding"<br>    xmlns:m="http://controlerDevice.org/controler"><br>   <data><br>    <at><br>    <data><br>     <year>2002</year><br>     <month>*</month><br>     <date>25</date><br>     <hour>24</hour><br>     <min>00</min><br>     <sec>00</sec><br>    </data><br>    </at><br>   </data><br>  </m:addSchedule><br> </env:Body><br></env:Envelope> |

FIG.11

| COMMAND FORMAT | deleteSchedule(ID OF UNIT SCHEDULE DATA) |
|---|---|
| EXAMPLE OF RESPONSE MESSAGE | HTTP/1.1 200 OK<br>Content-Type: application/soap+xml; charset="utf-8"<br>Content-Length: nnnn<br><br><?xml version="1.0"?><br><env:Envelope xmlns:env="http://www.w3.org/2001/12/soap-envelope"><br> <env:Header><br>  <m:targetDevice xmlns:m="http://controlerDevice.org/controler"<br>    env:mustUnderstand="true"><br>   terminal1234<br>  </m:targetDevice><br> </env:Header><br> <env:Body><br>  <m:deleteSchedule env:encodingStyle="http://www.w3.org/2001/12/soap-encoding"<br>    xmlns:m="http://controlerDevice.org/controler"><br>   <scheduleID>145</scheduleID><br>  </m:deleteSchedule><br> </env:Body><br></env:Envelope> |

FIG.12

| COMMAND FORMAT | readSchedule() |
|---|---|

EXAMPLE OF RESPONSE MESSAGE

```
HTTP/1.1 200 OK
Content-Type: application/soap+xml; charset="utf-8"
Content-Length: nnnn <?xml version="1.0"?>
<env:Envelope xmlns:env="http://www.w3.org/2001/12/soap-envelope">
  <env:Header>
    <m:targetDevice xmlns:m="http://controlerDevice.org/controler"
                    env:mustUnderstand="true">
      terminal1234
    </m/:targetDevice>
  </env:Header>
  <env:Body>
    <m:readSchedule env:encodingStyle="http://www.w3.org/2001/12/soap-encoding"
                    xmlns:m="http://controlerDevice.org/controler">
    </m:readSchedule>
  </env:Body>
</env:Envelope>
```

MANAGEMENT MEDIATING DEVICE, IMAGE PROCESSING APPARATUS, MANAGEMENT MEDIATING PROGRAM, AND STORING MEDIUM STORING MANAGEMENT MEDIATING PROGRAM

BACKGROUND OF THE INVENTION

1. Field of the Invention

The present invention relates to a management mediating device that mediates information transmitted and received between a management system and an image processing apparatus. Particularly, the present invention relates to a management mediating device that is provided for managing an image processing apparatus (a management object system) in an environment where a management system provided at a remote position performs communication, via the Internet, with the image processing apparatus provided inside a fire wall. Further, the present invention relates to an image processing apparatus that has a management mediating function of managing the image processing apparatus in an environment where a management system provided at a remote position performs communication, via the Internet, with the image processing apparatus provided inside a fire wall.

2. Description of the Related Art

There was developed a system in which a management object system established at a customer side (e.g., a facsimile machine, a copier, a printer, and so on) is managed from a remote management system established at position that is far from the management object system.

In the conventional remote management system, a plurality of image processing apparatuses at the side of a customer are protected and managed by an operation of a management system provided at a remote position via a communication line such as a telephone line. The remote management using the connection of the telephone line results in communication cost increase. In order to decrease the communication cost, there is a possible method in which the remote management is performed by using the Internet connection established from the local network at the side of a customer.

There is a possibility that a third party intrudes into the local network at a company, and data and a program of the company are illegally copied, altered or destroyed. For this reason, in many cases, a fire wall is provided at the local network. Accordingly, when the conventional remote management system is used as it is, the existence of the fire wall makes it difficult to perform the remote management of an image processing apparatus in the local network from the management system connected to the local network via an outside network such as the Internet.

When the image processing apparatus connected to the local network inside the fire wall is connected to the management system by using the Internet connection, there are many cases where the management system cannot transmit an instruction or request directly to the image processing apparatus due to the fire wall. This is because the fire wall is generally set such that a request transmitted to the Internet from the system inside the local network of the customer can pass though the fire wall, and a response to this request can pass through the fire wall, but a request transmitted from the Internet to the system inside the local network cannot pass through the fire wall.

In a case where the management object system is managed via the Internet, since the management object system is generally established inside a fire wall, it is necessary to start to make a connection to the remote management system from the management object system provided inside the fire wall in order to perform an HTTP (Hyper Text Transfer Protocol) communication.

However, the management system has a convenient and inconvenient timing, so that at a condition where only when the management object system makes a connection, the management system can issue a command to the management object system, the management system cannot perform management at an appropriate timing.

SUMMARY OF THE INVENTION

It is an object of the present invention to improve the above-mentioned inconvenience, and to enables a management system to manage a management object system at an appropriate timing at an environment where the management system manages the management object system via the Internet.

According to one aspect of the present invention, there is provided a management mediating device: comprising:

management system communication means for making a connection to a management system outside a fire wall from inside the fire wall, and receiving a command from the management system;

processing means for performing a process in accordance with the received command;

management object system communication means for transferring the command to a management object system;

storing means for storing a connection schedule of the management system communication means; and instructing means for, in accordance with the connection schedule, instructing the management system communication means to make a connection to the management system.

Thereby, in accordance with a previously set connection schedule, a connection can be made from the management mediating device to the management system. Therefore, even when the management mediating device and the management object system are provided inside the fire wall of a customer system, the management system can issue a command at a timing convenient for the management system to perform a remote management.

Furthermore, by using the schedule changing command, the connection schedule stored in the storing unit of the management mediating device can be changed in accordance with the convenience of the management system. Therefore, the management mediating device can establish a connection to the management system at a timing desired by the management system, so that the management system can issue a command at an appropriate timing.

According to another aspect of the present invention, there is provided an image processing apparatus that comprises a hardware resource including at least one of a displaying unit, a printing unit, a scanner unit, a facsimile unit, a hard disk, an imaging unit and a network interface, and provides a service including at least one of a printing service, a copying service, and a facsimile service, the image processing apparatus further comprising:

at least one application that performs a particular process for the service;

management system communication means for making a connection to a management system from an inside of a fire wall, and receiving a command from the management system positioned at an outside of the fire wall;

processing means for performing a process in accordance with the command;

storing means for storing a connection schedule of the management system communication means; and instructing means for, in accordance with the connection schedule, instructing the management system communication means to make a connection to the management system.

Thereby, a connection to the management system can be established from the image processing apparatus in accordance with a previously set connection schedule. Therefore, even when the image processing apparatus is provided inside the fire wall of a customer system, the management system can issue a command at a timing convenient for the management system to perform a remote management.

Furthermore, by using the schedule changing command, the connection schedule stored in the storing unit of the image processing apparatus can be changed in accordance with the convenience of the management system. Therefore, the image processing apparatus can establish a connection to the management system at a timing desired by the management system, so that the management system can issue a command at an appropriate timing.

Other objects, features, and advantages of the present invention will become more apparent from the following detailed description when read in conjunction with the accompanying drawings.

BRIEF DESCRIPTION OF THE DRAWINGS

FIG. 3 shows a configuration of a connection schedule shown in FIG. 2;

FIG. 4 is a flowchart of a basic management operation performed by the management mediating device;

FIG. 7 is a flowchart of a schedule providing operation performed by the management mediating device;

FIG. 8 shows an example of a SOAP message that is transmitted to a management system from the management mediating device at the time of connection start;

FIG. 9 shows an example of a response message including an all schedule changing command;

FIG. 10 shows an example of a response message including a schedule adding command;

FIG. 11 shows an example of a response message including a schedule deleting command;

FIG. 12 shows an example of a response message including a schedule requiring command;

DETAILED DESCRIPTION OF THE PREFERRED EMBODIMENT

A first embodiment of the present invention will be described with reference to FIGS. 1 through 13.

Figure 1:
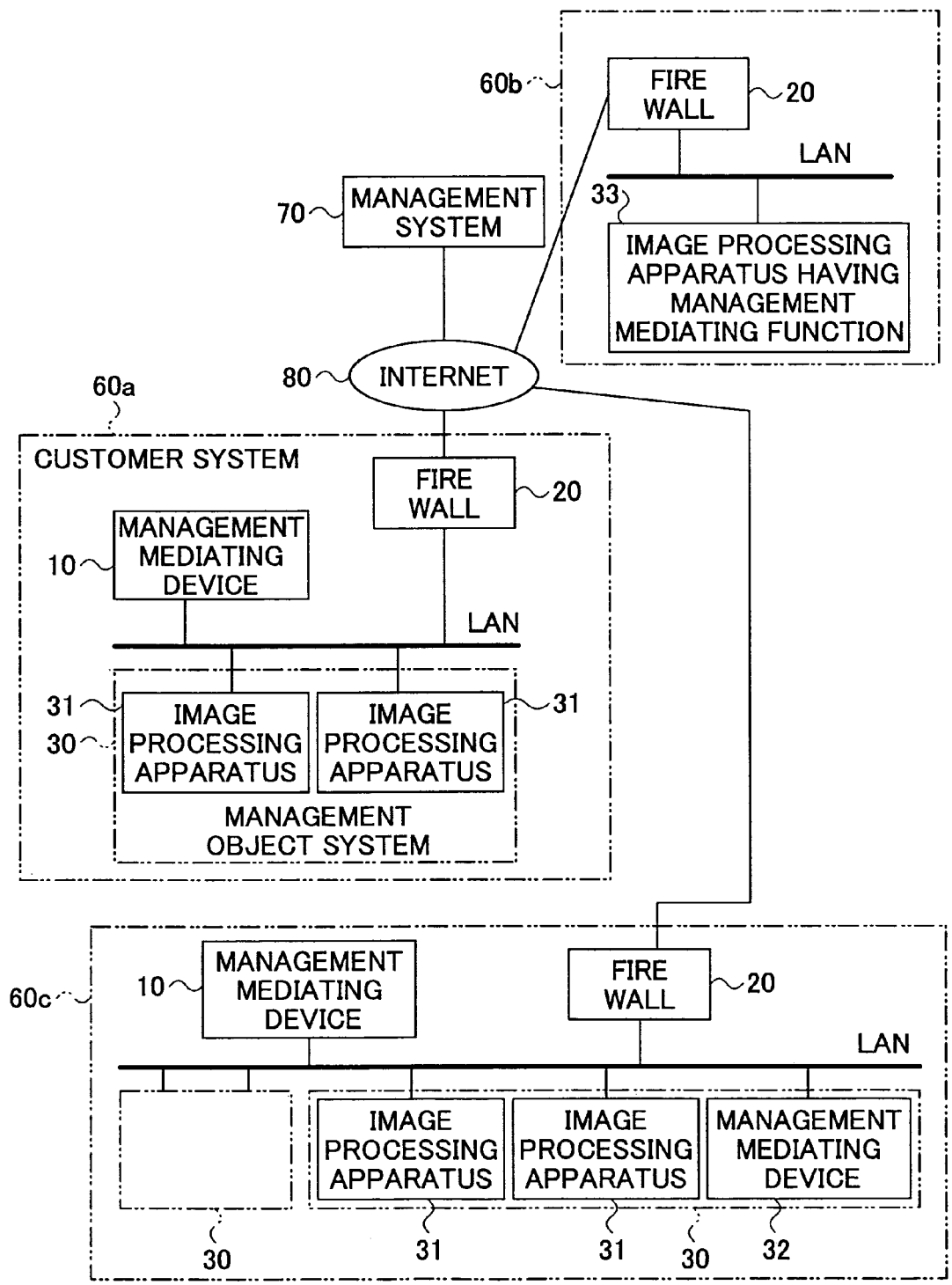
FIG. 1 shows an entire configuration of a remote management system including a management mediating device according to a first embodiment of the present invention.

FIG. 1 is a block diagram showing a connection relation between a management mediating device 10, a management object system 30, and a management system 70 that manages the management object system 30.

In a remote management system shown in FIG. 1, a customer system 60a is a system that is established at the side of a customer. In this customer system 60a, the management mediating device 10 is connected to the management object system 30 and a fire wall 20 by a LAN (local area network). The management object system 30 may include a plurality of image processing apparatuses 31 such as a facsimile machine, a copier, and a printer, and a digital composite machine thereof. The management mediating device 10 has a firmware updating function by which firmware provided in each of a plurality of image processing apparatus 31 can be updated by using Internet connection.

Similarly, a customer system 60c shown in FIG. 1 is another customer system established at the side of another customer. In the customer system 60c, a management mediating device 10 may be connected to a fire wall 20 and a plurality of management object systems 30 by a LAN. In the customer system 60c, one management system 30 may include a plurality of image processing apparatuses 31 such as a facsimile machine, a copier, a printer, and a composite machine thereof, and may include a management mediating device 32 that has the same firmware updating function as that of the management mediating device 10.

In this example of FIG. 1, this management object system 30 includes a plurality of image processing apparatuses 31, and one management mediating device 32. However, the management system 30 may further include other machines and devices. If only one management mediating device 10 is provided, a burden of this management mediating device 10 becomes large. For this reason, in this customer system 60c, the firmware updating function of updating the firmware of each of a plurality of image processing apparatuses 31 is assigned to the management mediating device 32, and the function of intensively performing remote management of a plurality of management systems 30 by using the Internet connection to the outside management system 70 is assigned to the management mediating device 10.

Similarly, a customer system 60b is another customer system established at the side of another customer. In the customer system 60b, an image processing apparatus 33 that has a management mediating function is connected to a fire wall 20 by a LAN. The image processing apparatus 33 having the management mediating function is an image processing apparatus that has the same firmware updating function as that of the management mediating device 10. This image processing apparatus 33 having the management mediating function will be described later with reference to FIGS. 14 through 16.

The customer systems 60a, 60b, and 60c configured as shown in FIG. 1 are connected, via the Internet 80, from an inside of the fire walls to the management system 70 provided outside the fire walls. The management system 70 performs remote management of each management object system 30 by using the Internet connection. In conjunction with examples shown in FIGS. 1 through 13, the remote management system that includes the management mediating device 10 will be described in the following.

The management system 70 and the management mediating device 10 may be configured so as to include a general computer. Specifically, the management system 100 and the management mediating device 10 may include a CPU that performs a process by a program, a RAM and ROM that are used for the process by the program, storing unit that may have a large capacity, and communication unit such as a modem and a network interface (not shown).

Figure 13A:
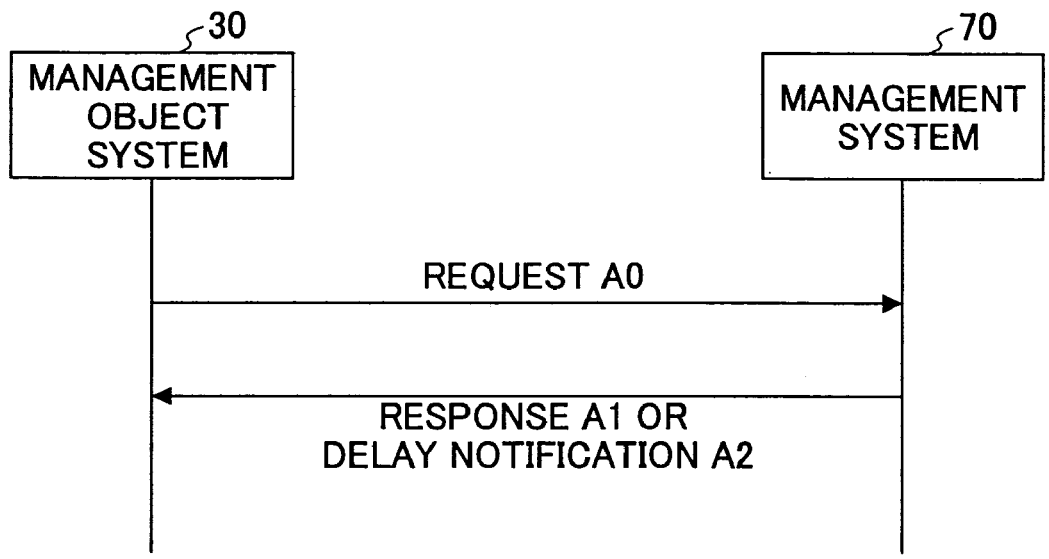
FIGS. 13A and 13B shows a sequence of an operation in which transmission and reception of a request and a response are performed between a management system and a management object system.
Figure 13B:
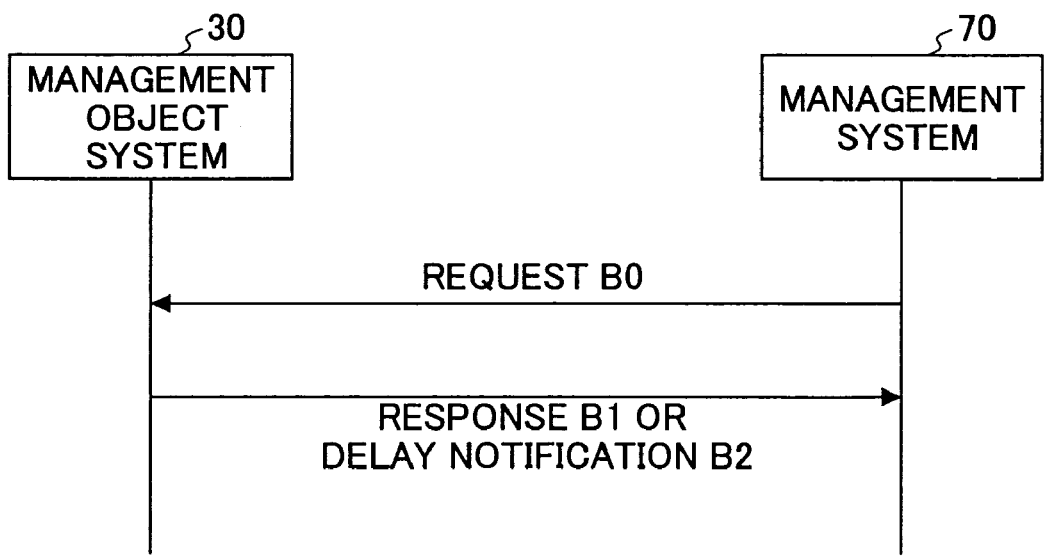

FIGS. 13A and 13B show an operation in which by using the Internet connection, transmission and reception of a request and a response are performed between the management system 70 and the customer system 60 including the management mediating device 10 and the management object system 30.

As described above, the fire wall for the local network at the side of the customer is generally set such that a request transmitted to the Internet from the system inside the local network of the customer can pass though the fire wall, and a response to this request can pass through the fire wall, but a request transmitted from the Internet to the system inside the local network cannot pass through the fire wall. Accordingly, in order to start the connection between the customer system 60 and the management system 70, since the fire wall exists, it is necessary that the connection start request should be transmitted from the management mediating device 10 to the management system 70.

In the remote management system as shown in FIG. 1, the management mediating device 10 has an incorporated application program for performing remote management of the management object system 30 connected to the management mediating device 10.

The management system 70 has an incorporated application program for performing control management of the management mediating device 10, and for performing remote management of the management object system 30 via the management mediating device 10. The management system 70, and the customer system 60 that includes the management mediating device 10 and the management object system 30 are configured so as to realize the remote management in which by using RPC (remote procedure call), a request (that requests a process to the mutually incorporated application program) is transmitted, and a response (that is a result of the requested process) is received.

In other words, the customer system 60 including the management mediating device 10 and the management object system 30 generates a request to the management system 70, and transmits the request to the management system 70 by using the Internet connection. Then, the customer system 60 receives a response to this request from the management system 70 by using the Internet connection. On the other hand, the management system 70 generates a request to the management mediating device 10, and transmits the request to the management mediating device 10 by using the Internet connection. Then, the management system 70 receives a response to this request from the management mediating device 10 by using the Internet connection. The request transmitted by the management system 70 includes a request that is sent to the management system 30 via the management mediating device 10. The response received by the management system 70 includes a response that is received from the management object system 30 via the management mediating device 10.

As a communication procedure for realizing the above-described RPC, a known protocol such as SOAP (simple object access protocol), HTTP (hypertext transfer protocol), FTP (file transfer protocol), COM (component object model), and CORBA (common object request broker architecture) can be used.

FIG. 13A shows a request/response operation in which the management object system 30 generates a request to the management system 70. In this case, the management object system 30 generates a request A0 of the image processing apparatus. The management object system 30 transmits the request A0 to the management system 70 via the management mediating device 10. The management system 70 receives this request, generates a response A1 to this request A0, and transmits this response to the management object system 30. Finally, the management object system 30 provided in the customer system 60 receives the response A1.

In the example shown in FIG. 13A, the management system 70 may transmit not only the response A1 but also a response delay notification A2. When the management system 70 that received the request A0 determines that the management system 70 cannot promptly transmit a response to this request A0, the management system 70 generates a response delay notification A2, cuts the connection for a some period of time, and transmits the response to the request A0 at the time of the next connection.

FIG. 13B shows a request/response operation in which the management system 70 generates a request to the management object system 30. In this case, the management system 70 generates a request B0 of the management system, and transmits this request B0 to the management object system 30 via the management mediating device 10. The management object system that received this request B0 generates a response B1 to this request B0, and transmits the response B1 to the management system 70.

Also in the example of FIG. 13B, the management object system 30 or the management mediating device 10 provided in the customer system 60 may transmit a response delay notification B2 when the management object system 30 or the management mediating device 10 cannot promptly transmit a response B1 to the request B0.

Figure 2:
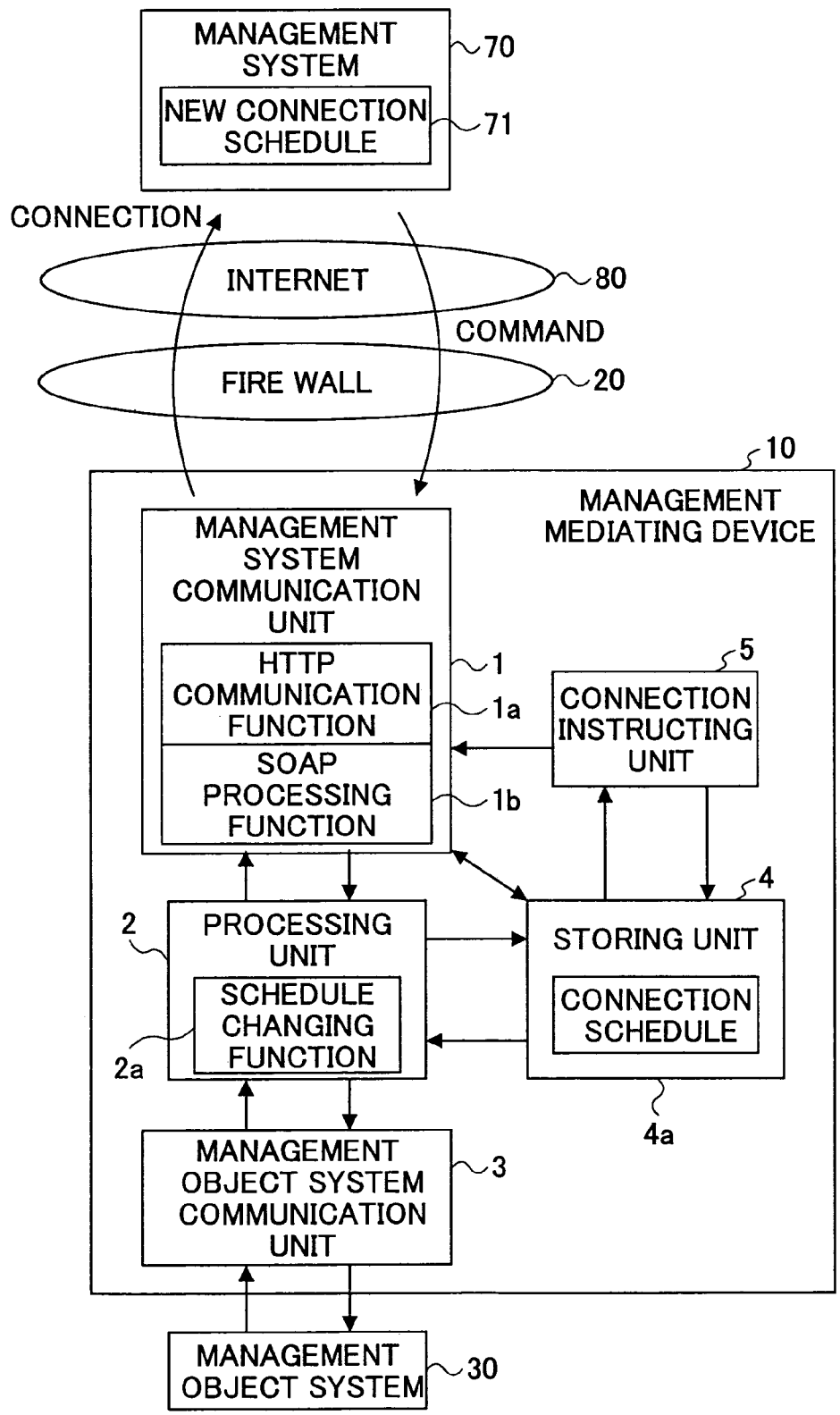
FIG. 2 is a block diagram showing an example of a configuration of the management mediating device of FIG. 1.

FIG. 2 is a block diagram showing a configuration example of the management mediating device 10 according to a first embodiment of the present invention. As shown in FIG. 2, the management mediating device 10 includes management system communication unit 1 for connecting the inside of the fire wall 20 via the Internet 80 to the management system 70 at the outside of the fire wall 20. The management mediating device 10 further includes processing unit 2 for receiving a command from the management system 70 and performing a predetermined process in accordance with the received command. The management mediating device 10 further includes management object system communication unit 3 for transferring a command to the management object system 30. The management mediating device 10 further includes storing unit 4 for storing a connection schedule 4a of the management system communication unit 1, and connection instructing unit 5 for, in accordance with the connection schedule 4a, instructing the management system communication unit 1 to make connection to the management system 70.

In the management mediating device 10, the above-mentioned CPU executes a previously prepared management mediating program to realize the management system communication unit 1, the processing unit 2, the management object system communication unit 3, and the connection instructing unit 5. The management mediating program may be down-loaded from the Internet to be installed, or may be installed from a storing medium such as a CD-ROM that previously stores the management mediating program.

According to the first embodiment of the present invention, the management system communication unit 1 has an HTTP communication function 1a of performing information transmission and reception with the management system 70 by HTTP communication. In addition, the management system communication unit 1 further has a SOAP (Simple Object Access Protocol) processing function of performing communication with the management system 70, based on SOAP.

As shown in FIG. 3A, the connection schedule 4a stored in the storing unit 4 has a data configuration showing the relation among a start date and time, an end date and time, and an interval. In this data configuration, a group of a plurality of a unit schedules 41 constitutes the connection schedule 4a, and an identifier ID is assigned to each unit schedule 41.

The connection instructing unit 5 performs the following process (connection instruction) in accordance with the connection schedule 4a.

In a case 1) where only a start date and time is specified, a connection instruction is performed at the start data and time. For example, when the start date and time is specified as in an ID 23 in FIG. 3A, the connection instruction is performed at year: 2002, month: April, date: 1, hour: 0, minute: 0, second: 0.

In a case 2) where only a time of a start date and time is specified, the connection instruction is performed at specified time every day. For example, if a start date and time is specified as in ID 13 in FIG. 3A, the connection instruction is performed at hour: 0, minute: 0, second: 0, every day.

In a case 3) where only the start date and time is specified, and a month of the start date and time is not specified, the connection instruction is performed at the specified start date and time every month. For example, if a start date and time is specified as in an ID 11 in FIG. 3A, the connection instruction is performed at date: 25, minute: 0, second: 0, every month in year: 2002.

In a case 4) where all of a start date and time, an end date and time, and an interval are specified, the connection instruction is periodically performed at the intervals in a period from the start date and time to the end date and time. For example, if all of a start date and time, an end date and time, and an interval are specified as in an ID 23 in FIG. 3B, the connection instruction is periodically performed at intervals of one hour in a period from year: 2002, month: April, date: 1, hour: 0, minute: 0, second: 0 to year: 2003, month: April, date: 1, hour: 0, minute: 0, second: 0.

In a case 5) where all of a start date and time, an end date and time, and an interval are specified, but only times of the start date and time and the end date and time is specified, the connection instruction is performed at the specified intervals every day in a period from start time to the end time. For example, all of a start date and time, an end date and time, and an interval are specified as in an ID 23 in FIG. 3C, the connection instruction is performed every day at intervals of half an hour in a period from hour: 14, minute: 0, second: 0 to hour: 18, minute: 0, second: 0.

In a case 6) where a start date and time and an interval are specified, but an end date and time is not specified, the connection instruction is periodically performed from the start date and time for an indefinite period. For example, if the specifying is made as in an ID 23 in FIG. 3D, the connection instruction is periodically performed at intervals of three hours from year: 2002, month: April: date: 1, hour: 0, minute: 0, second: 0 for an indefinite period.

Meanwhile, the processing unit 2 has a schedule changing function of changing the connection schedule 4a stored in the storing unit 4 in accordance with a command. According to the schedule changing function, when a command is a schedule adding command, a connection schedule attached to the command is added to the connection schedule 4a of the storing unit 4. In other words, a row for a new unit schedule 41 is added to a list of the connection schedule shown in FIG. 3A. A schedule to be added is attached to the a schedule adding command transmitted from the management system 70.

As one example of a configuration of the schedule adding command, a command format 94 shown in FIG. 10 can be used.

Furthermore, according to the schedule changing function, when a command is a schedule deleting command, the processing unit 2 retrieves, from the storing unit 4, a unit schedule 41 corresponding to an identifier ID attached to the command, and deletes the retrieved unit schedule 41. For example, when a deleting target ID is an ID 23, the unit schedule 41 at the first row in FIG. 3A is deleted. A schedule to be deleted is attached to a schedule deleting command transmitted from the management system 70. As one example of the schedule deleting command, a command format 96 shown in FIG. 11 can be used.

In addition, according to the schedule changing function, when a command is an all schedule changing command, the processing unit 2 obtains an Internet address (e.g., URL (Uniform Resource Locator)) attached to the command, causes the management system communication system 1 to obtain a new connection schedule 71 existing at this Internet address, by HTTP downloading, FTP downloading, or the like, and replaces the connection schedule 4a in the storing unit with the new connection schedule 71. In this case, the management system communication unit 1 itself may obtain the new connection schedule from the Internet address by using HTTP downloading, FTP downloading, or the like without asking the management system 70 to provide the new connection schedule. The Internet address is attached to the schedule all-together changing command transmitted from the management system 70. Alternatively, the management system communication unit 1 may ask the management system 70 to provide the new connection schedule when the new connection schedule exists at the side of the management system 70, for example. As one example of the all schedule changing command, a command format 92 shown in FIG. 9 can be used.

When a command is a schedule requiring command, the processing unit 2 reads the connection schedule 4a from the storing unit 4, and causes the management system communication unit 1 to provide the connection schedule 4a to the management system 70. As one example of the schedule requiring command, the command format 98 shown in FIG. 12 can be used.

The reason why the management system 70 issues a schedule requiring command is that there is a case in which the management system 70 desires to refer to the connection schedule currently set in the management mediating device 10 when reviewing changing of the connection schedule 4a.

Next, operations of the management mediating device 10 will be described with reference to flowcharts of FIGS. 4 through 7. The CPU of the management mediating device 10 executes the management mediating program to perform the following operations.

FIG. 4 is a flowchart showing a basic management operation performed by the management mediating device 10. The basic management operation is performed so that the management system 70 can manage the management object system 30.

The connection instructing unit 5 periodically monitors the connection schedule 4a in the storing unit 4. Furthermore, when detecting a timing of the connection instruction to the management system communication unit 1 by comparing this timing with a timer (not shown), the connection instructing unit 5 provides the connection instruction to the management system communication unit 1.

When receiving the connection instruction, the management system communication unit 1 activates the HTTP communication function, and makes connection to the management system 70 via the fire wall and the Internet. At this time, when using the SOAP processing function 1b of the management system communication unit 1, the above-described request/response operation is performed between the management system communication unit 1 and the management system 70.

In response to the connection to the management system 70 made by the management system communication unit 1, the management system 70 creates a previously prepared command in accordance with the SOAP standards and transmits the command to the management mediating device 10.

This command is received by the management system communication unit 1 using the HTTP communication function. Thereafter, the management system communication unit 1 extracts a substantive command portion by using the SOAP processing function. Then, the extracted command portion is stored (accumulated) in the storing unit 4. When the processing unit 2 reads the command from the strong unit 4 at a predetermined timing, and determines that the destination of the command is the management object system 30, the processing unit 2 sends the command to the management object system communication unit 3. (At this time, two or more commands accumulated in the storing unit 4 may exist, and the commands of which destinations are the management object system 30 may be sent to the management object system communication unit 3.) Thereafter, the command is input to the management object system 30 from the management object system communication unit 3. Each of the devices included in the management object system 30 receives the command that should be transferred to itself, and performs a predetermined operation specified by the received command. One example of the predetermined operation may be an operation in which a counter value of the number of pages printed by the image processing apparatus is read, and the read counter value is output as a response to the command. Another example of the predetermined operation may be an operation in which a temperature of a heater incorporated in the image processing apparatus is controlled to be a temperature indicated in the command.

After processing the command, the management object system 30 outputs a response to the command. This response may include a parameter such as a counter value of the number of printed pages, a command process status (e.g., indicating that the operation specified by the command was normally completed, or that the operation specified by the command was abnormally completed), and so on. This response is received by management object system communication unit 3, and is stored in the storing unit 4.

Furthermore, when the management system communication unit 1 detects a predetermined timing (defined in the connection schedule 4a in the storing unit 4) of making connection to the management system 70, the management system communication unit 1 starts to make connection to the management system 70. Accompanying this connection, the response stored in storing unit 4 received from the management object system 30 is transferred to the management system 70. (At this time, two or more responses accumulated in the storing unit 4 may exist, and these responses may be transferred to the management system.) When receiving the response from the management object system 30, the management system 70 transmits to the management mediating device, reception OK information to the effect that the management object system 30 normally received the command. In this manner, a series of processes from issuing of the command to the response to the command are performed.

Meanwhile, when a destination of a command issued by the management system 70 is the management mediating device, the processing unit 2 determines that the destination of the is the management mediating device itself 10, and performs a process in accordance with the contents of the command. This process may include a process of changing the connection schedule 4a described later. When the processing unit 2 processes the command, a response to the command is generated and issued by the processing unit 2, and is stored (accumulated) in the storing unit 4. The response stored in the storing unit 4 is sent to the management system 70 in the manner similar to the response from the management object system 30.

In accordance with the previously set connection schedule, the connection to the management system is made from the side of the management mediating device, so that the management system 70 can issue a command at a convenient timing even when the management mediating device and the management object system are established inside the fire wall.

Figure 5:
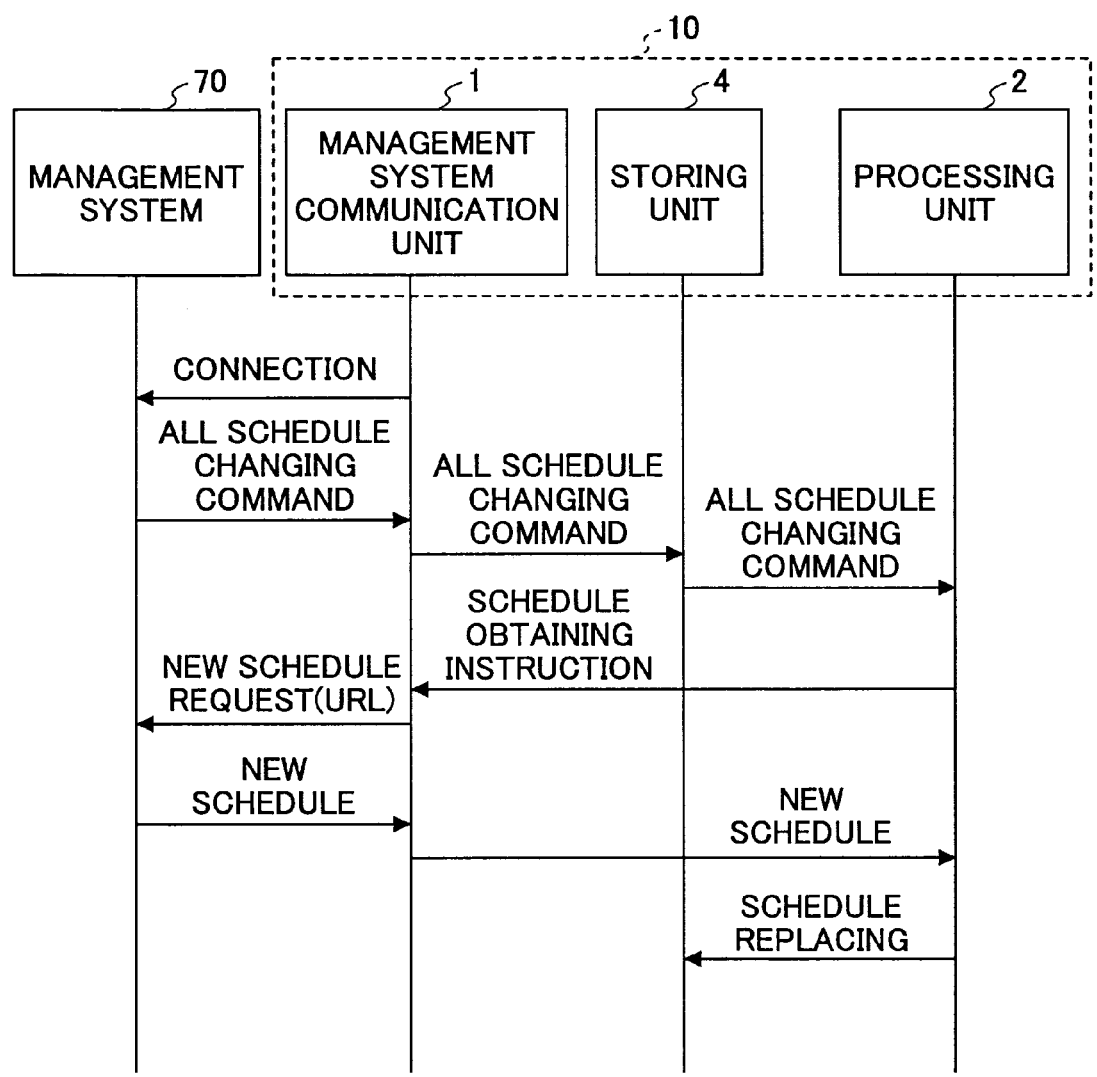
FIG. 5 is a flowchart of an all schedule changing operation performed by the management mediating device.
Figure 6:
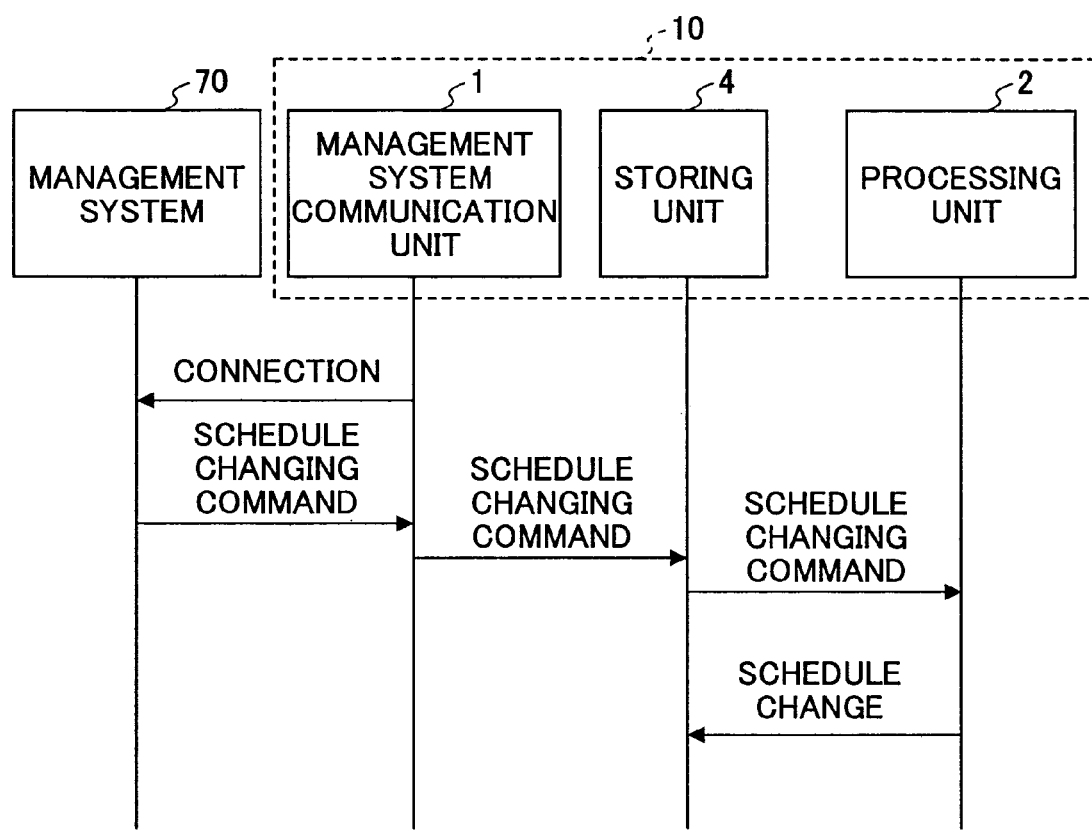
FIG. 6 is a flowchart of a partial schedule changing operation performed by the management mediating device.

FIGS. 5 and 6 are flowcharts showing processes of changing the connection schedule 4a stored in the storing unit 4. Each process (operation) shown in FIGS. 5 and 6 is performed by the schedule changing function 2a of the processing unit 2.

FIG. 5 is a flowchart showing a process of changing all contents of the connection schedule. Specifically, the entire schedule 4a constituted by a group of unit schedules 41 is replaced with a new connection schedule 71. As described with reference to FIG. 4, when the management system communication unit 1 makes connection to the management system 70 in accordance with the connection schedule 4a, the management system 70 issues an all schedule changing command to the management mediating device 10. The all schedule changing command is received by the management system communication unit 1, and is stored (accumulated) in the storing unit 4. Thereafter, the processing unit 2 reads the all schedule changing command from the storing unit 4 at a predetermined timing. When the processing unit 2 determines that a destination of the all schedule changing command is the management mediating device 10, the processing unit 2 activates the schedule changing function to start the process of changing all schedule.

An URL on the Internet at which a new connection schedule 71 is stored is previously attached, as an argument, to an all schedule changing command issued from the management system 70. The processing unit 2 extracts the URL for the new connection schedule attached to the all schedule changing command, and instructs the management system communication unit 1 to download the new connection schedule from the URL. Alternatively, the management system communication unit 1 activates the HTTP communication function, and requests the management system 70 to provide the new connection schedule. In response to this request, the management system 70 provides (transmits) the requested new connection schedule to the management mediating device 10. A method of transmitting the new connection schedule to the management mediating device 10 includes HTTP downloading, FTP downloading, a file attached to email, and so on. These new connection schedule transmitting methods performed between the management system 70 and the management system communication unit 1 may be switched among HTTP downloading, FTP downloading, and so on. The management system communication unit 1 receives the new connection schedule from the management system 70, and sends the new connection schedule to the processing unit 2. The processing unit 2 overwrites the obtained new connection schedule 71 on the connection schedule 4a stored in the storing unit 4 to update the connection schedule. Thereafter, the updated connection schedule is referred to in the schedule confirming (monitoring) operation described with reference to FIG. 4, so that a connection timing to the management system 70 thereafter is changed.

FIG. 6 shows a process of changing a part of the connection schedule (adding or deleting a unit schedule). The management system communication unit 1 starts to make a connection to the management system 70 at a timing determined in the connection schedule. The operation until a schedule changing command is read by the processing unit 2 is the same as in the case of an all schedule changing command. When the processing unit 2 determines that the schedule changing command read from the storing unit 4 is a schedule adding command whose destination is the management mediating device itself 10, the processing unit 2 extracts a new unit schedule 41 attached to the schedule adding command, and adds the extracted unit schedule 41 to the connection schedule 4a stored in the storing unit 4. In other words, the new additional unit schedule 41 is added to the connection schedule 4a constituted by a group of unit schedules 41. Thereafter, in the schedule confirming operation above described with reference to FIG. 4, the changed connection schedule 4a is referred to, so that a new timing of connecting to the management system 70 is added.

Meanwhile, when the processing unit 2 determines that a schedule changing command stored in the storing unit 4 is a schedule deleting command whose destination is the management mediating device itself 10, the processing unit 2 extracts an ID (identifier) of a deleting target unit schedule attached to the schedule changing command, searches the connection schedule 4a to find a unit schedule 41 corresponding to the ID, and deletes the found unit schedule 41 from the connection schedule 4a. In other words, a specific unit schedule 41 is deleted from the connection schedule 4a constituted by a group of unit schedules 41. Thereafter, in the schedule confirming (monitoring) operation above described with reference to FIG. 4, the changed connection schedule is referred to, so that a timing of connecting to the management system 70 is deleted.

According to the above-described all schedule changing process and partial schedule deleting process, a connection schedule 4a stored in the management mediating device 10 is changed in accordance with a convenient time for the management system 70. Accordingly, the management mediating device 10 can establish connection to the management system 70 at a timing that is desired by the management system 70, and the management system 70 can issue a management command to the management mediating device 10 at the desired timing.

FIG. 7 is a flowchart of an operation in which a connection schedule stored in the storing unit 4 is provided to the management system 70. In a case of partially changing the connection schedule 4a, if the management system 70 previously knows the connection schedule 4a stored in the management mediating device 10, it is useful in determining about adding of a unit schedule, deleting of a unit schedule, and so on. Accordingly, in response to a request from the management system 70, the connection schedule 4a stored in the management mediating device 10 is provided to the management system 70.

As described with reference to FIG. 4, when the management system communication unit 1 establishes a connection to the management system 70 at a timing defined in the connection schedule, a schedule requesting command is issued from the management system 70. This schedule requesting command is received by the management system communication unit 1, and is accumulated in the storing unit 4. Thereafter, the processing unit 2 reads the schedule requesting command from the storing unit 4, and reads a current connection schedule 4a from the storing unit 4 in accordance with the read schedule requesting command. Subsequently, the read current connection schedule 4a is transmitted by the management system communication unit 1 to the management system 70. At this time, a method of transmitting the current connection schedule 4a to the management system 70 from the management system communication unit 1 may be a method in which a command response including the connection schedule 4a is transmitted, or a method in which the connection schedule 4a is transmitted as an attachment fie of email whose destination is the management system 70. At the side of the management system 70, it is possible to add or delete a schedule to or from the connection schedule 4a, based on the connection schedule 4a received from the management mediating device 10.

In the first embodiment, the management system communication unit 1 may have the SOAP processing function. With the SOAP processing function, a connection from the management mediating device 10 to the management system 70 may be issued in accordance in the SOAP standard. A command of the SOAP standard issued from the management system 70 may be processed with the SOAP processing function.

FIG. 8 shows an example of a message that is transmitted to the management system 70 at the time of connection start.

FIG. 9 shows a response message example 93 of the management mediating device 10 when the management mediating device 10 receives an all schedule changing command 92 from the management system 70.

FIG. 10 shows a message response example 95 of the management mediating device 10 when the management mediating device 10 receives a schedule adding command 94 from the management system 70.

FIG. 11 shows a message example of the management mediating device 10 when the management mediating device 10 receives a schedule deleting command 96 from the management system 70.

FIG. 12 shows a response message example 99 of the management mediating device 10 when the management mediating device 10 receives a schedule requesting command 98 from the management system 70.

Next, a second embodiment of the present invention will be described with reference to FIGS. 14 through 16.

Figure 14:
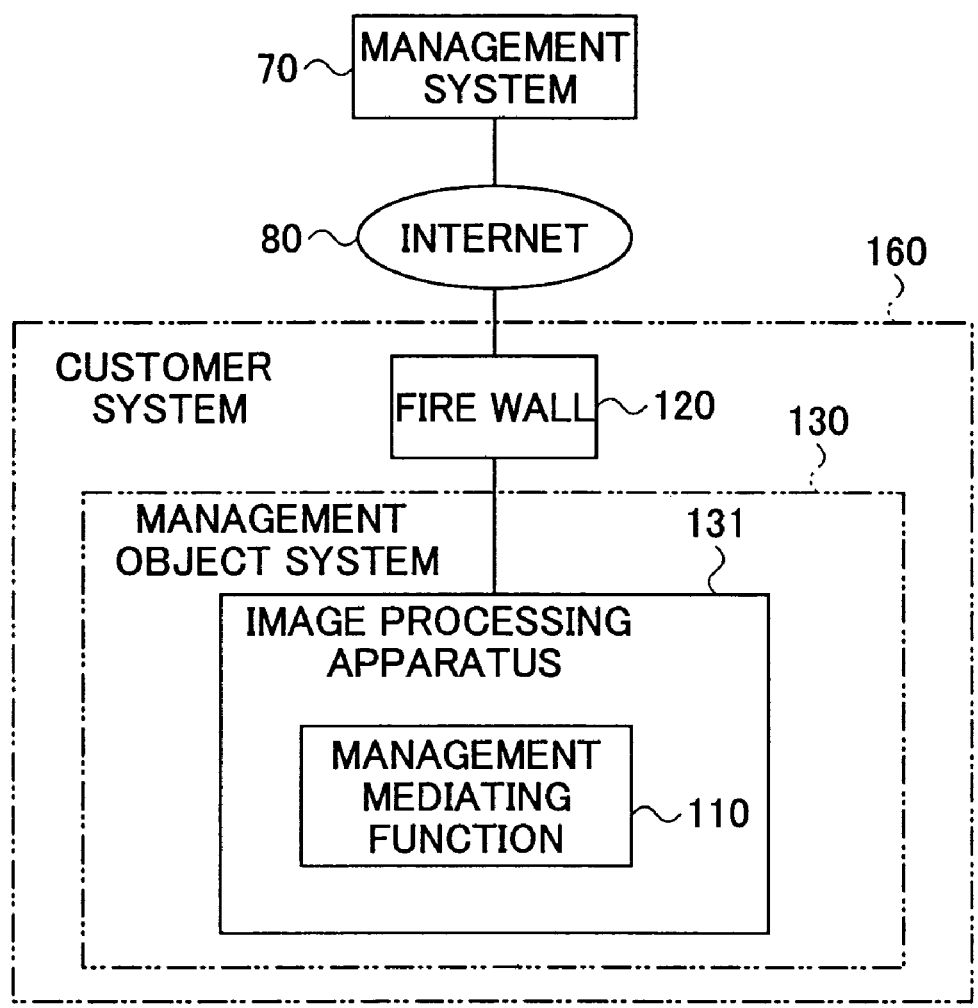
FIG. 14 is a block diagram showing an entire configuration of a remote management system that includes an image processing apparatus according to a second embodiment of the present invention.

FIG. 14 is a block diagram showing a connection relationship between an image processing apparatus 131, a management object system 130, and a management system 70. The image processing apparatus 131 of FIG. 14 is an example of the image processing apparatus 33 having the management mediating function of FIG. 1. The image processing apparatus 131 has a management mediating function 10. The management system 70 manages the management object system 130.

In FIG. 14, a customer system 160 is a system established at the side of a customer. In the customer system 160, the image processing apparatus 131 is connected to the management object system 130, and a fire wall 120 by a LAN (local Area Network). The image processing apparatus 131 may be a facsimile machine, a copier, a printer, or a complex machine thereof, for example. In this example, only one image processing apparatus 131 is shown as the management object system 130 in FIG. 14, but additional one, several, or many devices may be included in the management object system 130. Furthermore, in this example, the customer system 130 includes one image processing apparatus 131, but the customer system 131 may include a plurality of image processing apparatuses 131.

The customer system 160 is connected to the management system 70 via the fire wall 120 by means of the Internet 80. The management system 70 manages the management object system 130 via the Internet 80.

The image processing apparatus 131 having the management mediating function is configured to include a general computer. Specifically, the image processing apparatus 131 is configured to include at least a CPU that performs a process using a program, a RAM and ROM used for the process by the CPU, storing unit having a large capacity, and communication unit such as a modem or a network interface (not shown).

Figure 15:
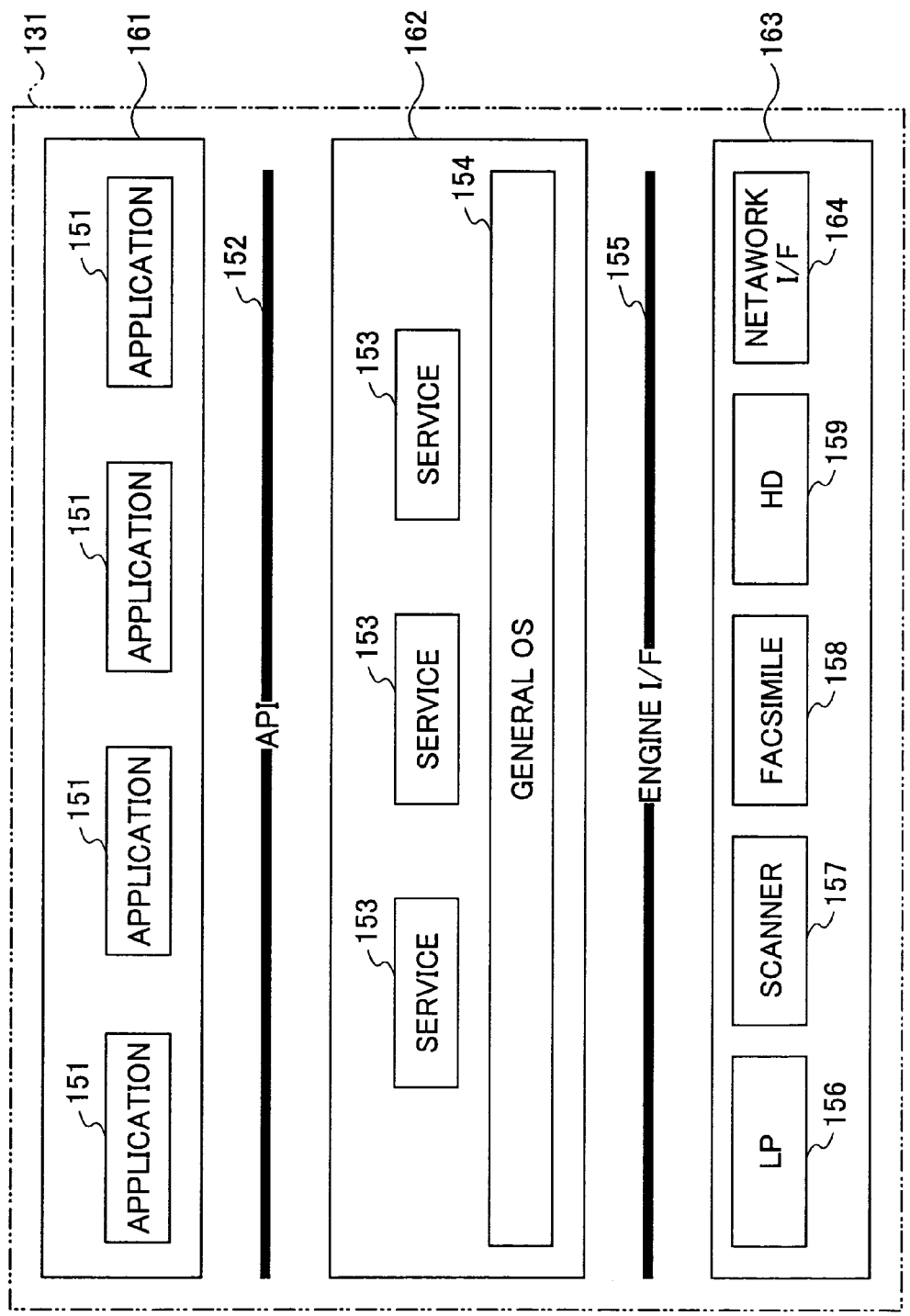
FIG. 15 is a block diagram showing a configuration example of hardware and software of the image processing apparatus of FIG. 14.

FIG. 15 shows software of a complex machine and an equipment configuration as an exemplary configuration of the image processing apparatus 131. As shown in FIG. 15, the image processing apparatus 131 includes hardware resource 163 having a line printer (LP) 156, a scanner 157, a facsimile machine 158, a hard disk (HD) 159, and a network interface (network I/F) 164. A platform 162 has a general-purpose operating system 154 and a plurality of services 153, and an application 161 includes a plurality of applications 151. Communication of information, a command, and a process request between the application 161 and the platform 162 is performed by an API (application program interface). Communication of information, a command, and a process request between the platform 161 and the hardware resource 163 is performed by an engine interface 155.

In the platform 162, one or a plurality of services 153, and the general-purpose operating system 154 are provided for interpreting a process request from the application 161 and generating a request of acquiring the hardware resource 163. In other words, the platform 162 uses one or a plurality of services 153 and the general-purpose operating system 154 to manage one or a plurality of hardware resources 163.

The general-purpose operating system 154 may be UNIX (R) that performs a parallel process of respective software of the platform 162 and the application 161. Furthermore, the general-purpose operating system 154 performs the management mediating function 110 (refer to FIG. 14) in cooperation with a plurality of applications 151 and a plurality of services 53.

Further, the image processing apparatus 131 performs communication with the management object system 130, the customer system 160, the fire wall 120, the Internet 80, and the management system 70 via the network interface 164.

Figure 16:
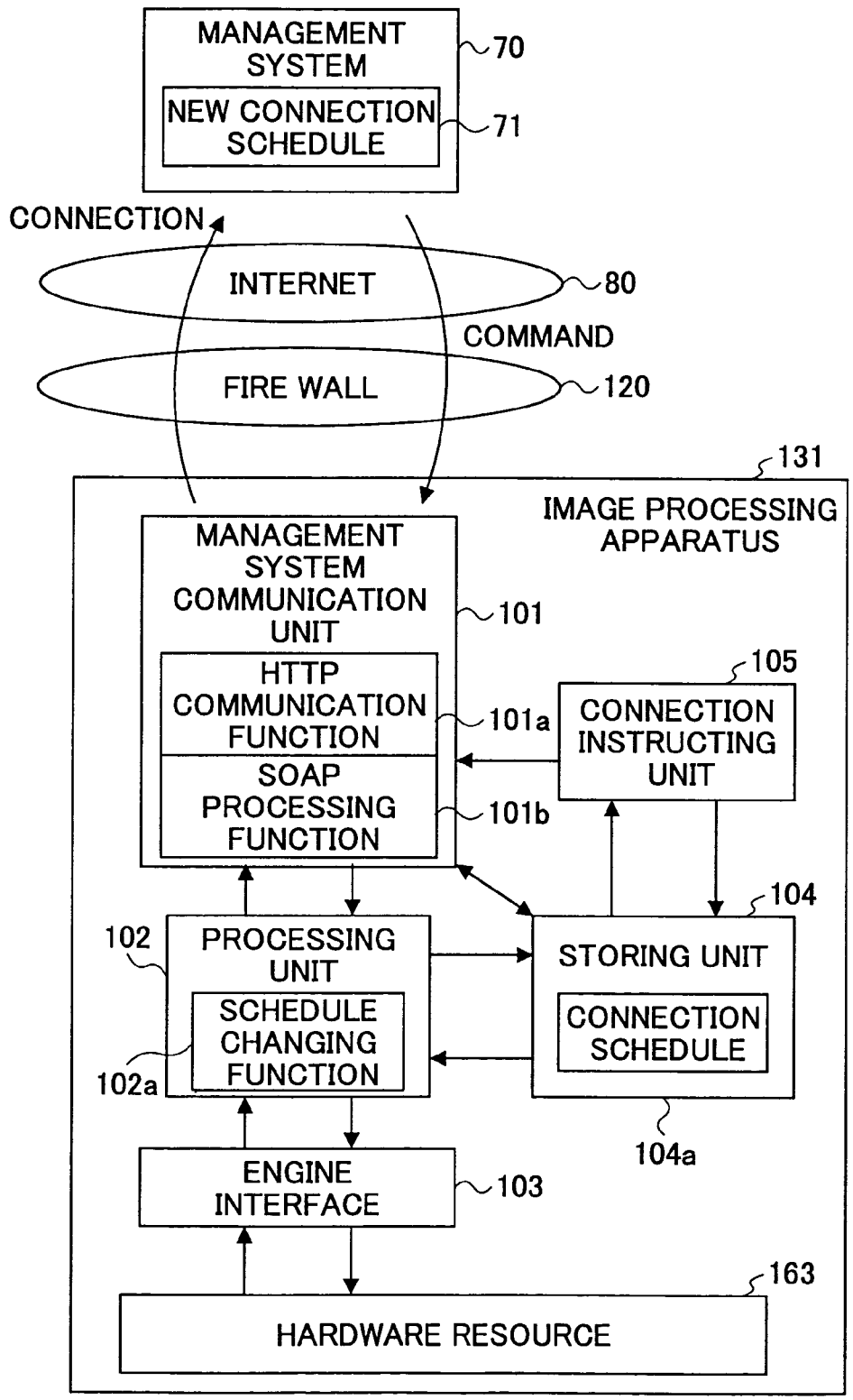
FIG. 16 is a block diagram showing an example of a configuration of the image processing apparatus of FIG. 14.

FIG. 16 is a block diagram showing a configuration of the image processing apparatus 131 according to the second embodiment of the present invention. The image processing apparatus 131 includes a management system communication unit 101 for making connection from the inside of the fire wall 120 to the management system 70 outside the fire wall 120 via the Internet. The image processing apparatus 131 further includes processing unit 102 for receiving a command from the management system 70, and performing a predetermined process in accordance with the received command. The image processing apparatus 131 further includes an engine interface 103 that transfers the command as a test signal to the hardware resource 163. The image processing apparatus still further includes storing unit 104 for storing connection schedule 104a of the management system communication unit 101, and connection instructing unit 105 for instructing the management system communication unit 101 to make a connection to the management system 70 in accordance with the connection schedule 4a.

The above-mentioned CPU performs the previously prepared management mediating function 110 (refer to FIG. 14) to realize the management system communication unit 101, the processing unit 102, the engine interface 103, and the connection instructing unit 105. The management mediating 110 may be previously downloaded from the Internet, and installed in the image processing apparatus 131, or may be installed in the image processing apparatus 131 from a recording medium such as a CD-ROM.

Specifically, according to the second embodiment of the present invention, the management system communication unit 101 includes an HTTP communication function of realizing information transmission and reception by HTTP communication with the management system 70. Furthermore, according to the second embodiment, the management system communication unit 101 includes a SOAP processing function 101b of realizing communication with the management system 70 based on SOAP. The SOAP processing function 101b enables the management system communication unit 101 to request the connection from the image processing apparatus 131 to the management system 70 in accordance with the SOAP protocol. Further, the SOAP processing function 101b enables the management system communication unit 101 to process a command of the SOAP protocol received from the management system 70.

The connection schedule 104a stored in the storing unit 104 has a data configuration specifying a start date and time, an end date and time, and an interval, as shown in FIGS. 3A through 3D. The connection schedule 104a is constituted by a group of a plurality of unit schedules 41, and an identifier (ID) is attached to each unit schedule 41.

The data configuration of the connection schedule 104a is the same as that shown in FIGS. 3A through 3D. Further, a connection instructing method performed by the connection instructing unit 105 using the connection schedule 104a is basically same as that in the first embodiment shown in FIG. 2. Accordingly, the description of the data configuration of the connection schedule 104a and the connection instructing method in the second embodiment are omitted.

In the image processing apparatus 131 shown in FIG. 16, the connection instructing unit 105 provides, to the management system communication unit 101, any one of the connection instructions corresponding to the respective above-described cases 1) through 6).

The processing unit 102 includes a schedule changing function of changing a connection schedule 104a of the storing unit 104 in accordance with a command. According to the schedule changing function, when a command is a schedule adding command, a connection schedule attached to a schedule adding command is added to the connection schedule 104a of the storing unit 104. In other words, a new row of a unit schedule 41 is added to the connection schedule list shown in FIG. 3A. A schedule to be added is attached to a schedule adding command transmitted from the management system 70. In this case, as one example of the schedule adding command, the command format 94 shown in FIG. 10 can be used.

Furthermore, according to the schedule changing function, when a command is a schedule deleting command, the processing unit 102 finds from the storing unit 104 a unit schedule 41 corresponding to an identifier attached to the schedule deleting command, and deletes the found unit schedule 41. For example, when an ID of a deleting target schedule is 23, a unit schedule at a first row of FIG. 13A is deleted. An ID of a schedule to be deleted is attached to a schedule deleting command transmitted from the management system 70. As one example of the schedule deleting command, the command format 96 shown in FIG. 11 can be used.

According to the schedule changing function, when a command is an all schedule changing command, the processing unit 102 extracts an Internet address (e.g., URL) attached to the all schedule deleting command. Then, the processing unit 102 causes the management system communication unit 101 to obtain a new connection schedule 71 that exits at this Internet address. Thereafter, the processing unit 102 replaces the connection schedule 104a of the storing unit 104 with the new connection schedule 71. The Internet address is attached to an all schedule changing command transmitted from the management system 70. As one example of the all schedule changing command, the command format 92 shown in FIG. 9 can be used.

On the other hand, when a command is a schedule requesting command, the processing unit 102 reads a connection schedule 104a from the storing unit 104, and causes the management system communication unit 101 to provide the connection schedule 104a to the management system 70. As one example of the schedule requiring command, the command format 98 shown in FIG. 12 can be used.

The reason why the management system 70 issues a schedule requesting command is that there is a case where the management system desires to refer to a connection schedule currently set in the image processing apparatus 131 at the time of reviewing a change of the connection schedule 4a.

Next, operations of the image processing apparatus 131 will be described. The CPU of the image processing apparatus 131 performs a management mediating function in cooperation with a plurality of applications 151 and services 153 to realize the operation of the image processing apparatus 131. The basic management operation performed by the image processing apparatus 131 according to the second embodiment is the same as the basic management operation of the management mediating device 10 in the first embodiment that is described above with reference to FIG. 4. Accordingly, an illustration of the basic management operation in the second embodiment is omitted. The basic management operation is an operation in which the management system 70 performs remote management of the management system 130 including the image processing apparatus 131.

The connection instructing unit 105 periodically monitors the connection schedule 104a of the storing unit 104, and compares the connection schedule 104a with a timer (not shown) to detect a timing of making a connection to the management system 70. When the connection instructing unit 105 detects a timing of making a connection, the connection instructing unit 105 provides to the management system communication unit 101 an instruction of making a connection to the management system 70. When receiving this instruction, the management system communication unit 101 activates an HTTP communication function, and makes a connection to the management system 70 via the fire wall and the Internet. At this time, when the SOAP processing function 101b of the management system communication unit is used, the above-described request/response operation is performed between the management system communication unit 1 and the management system 70 by using a signal transmitted and received in accordance with the SOAP protocol.

In accordance with the SOAP standard, the management system 70 generates, as a response to this connection, a command that is prepared in advance and of which destination is the management object system 130, and transmits this command to the image processing apparatus 131.

By using the HTTP communication function, the management system communication unit 101 receives this command. Then, by using the SOAP processing function, the management system communication unit 101 extracts a substantive command portion from the received command, and the extracted command portion is stored (accumulated) in the storing unit 104. At a predetermined timing, the processing unit 102 reads the command (or, two or more commands) accumulated in the storing unit 104. When the read command is a command of requesting information of hardware resource, the processing unit 102 sends this command as a test signal to the engine interface 103. This test signal is input to the hardware resource 163 from the engine interface 103.

The hardware resource 163 performs a predetermined operation indicated by this test signal. For example, this predetermined operation may be an operation of reading a counter value of the number of pages printed by the image processing apparatus 131, and outputting the counter value as a response to the command, or may be an operation of controlling a temperature of a heater incorporated in the image processing apparatus 131 to be a predetermined value indicated in the command.

The hardware resource 163 performs such a predetermined operation, and outputs a response to the test signal. For example, this response may include a parameter such as the counter value of the number of printed pages, or a status of the processed command (normally processed or abnormally processed).

This response is received by the engine interface 103, and stored in the storing unit 104.

Subsequently, when the management system communication unit 101 detects a predetermined timing of making a connection to the management system 70 (a timing defined in the connection schedule 104a stored in the storing unit 104), as described above, the management system communication unit 101 starts to make a connection to the management system 70. At this time, accompanying the connection, the response from the hardware resource 163 stored in the storing unit 104 is transferred to the management system 70. When receiving the response from the management object resource 163, the management system 70 transmits to the management object system 130 information indicating reception OK as a confirmation that the management system 70 has normally received the response. In this manner, a series of processes from a command issue to a response thereto are completed.

When a command issued by the management system 70 is a command of which target is a connection schedule stored in the storing unit 104, the processing unit 102 performs a process in accordance with the contents of the command. This process includes a process of changing the connection schedule 104a described later in detail. When the processing unit 102 performs this process, a response to the command is generated and issued by the processing unit 102, and is stored in the storing unit 104. This response stored in the storing unit 104 is sent to the management system 70 in the same manner in which the response from the hardware resource 163 is sent to the management system 70.

Thus, following a previously set connection schedule, a connection to the management system 70 is established from the side of the image processing apparatus 131. Therefore, even when the image processing apparatus 131 and the management object system 130 are established inside the fire wall, the management system 70 can issue a command at a timing convenient for the management system 70.

A process of changing the connection schedule may be realized by a schedule changing function 102a of the processing unit 102.

The all schedule changing operation performed by the image processing apparatus 131 according to the second embodiment is basically same as that of the management mediating device 10 in the first embodiment described with reference to FIG. 5. Accordingly, an illustration of this operation is omitted.

In this operation, the entire connection schedule 104a constituted by a group of unit schedules 41 is replaced with a new connection schedule 71.

As described, when the management system communication unit 101 makes a connection to the management system 70 at a timing that follows the connection schedule 4a, the management system 70 issues to the management system communication unit 101 an all schedule changing command. This all schedule changing command is received by the management system communication system 101, and is stored in the storing unit 104. Thereafter, the processing unit 102 reads the all schedule changing command from the storing unit 104 at a predetermined timing. When determining that the command indicates changing of the entire connection schedule 104a stored in the storing unit 104, the processing unit 102 activates the schedule changing function to change all schedules.

An URL at the Internet where the new connection schedule 71 is stored is attached as an argument in advance to an all schedule changing command issued by the management system 70. The processing unit 102 extracts the URL of the new connection schedule 71 attached to the all schedule changing command, and instructs the management system communication unit 101 to download the new connection schedule 71 from the URL. Alternatively, the management system communication unit 101 activates the HTTP communication function (or an FTP communication function, or en email transmission function (not shown), and requests the management system 70 to provide the new connection schedule 71.

In response to this request, the management system 70 provides the requested new connection schedule 71 to the management system communication unit 101. A method of providing the new connection schedule 71 may include HTTP downloading, FTP downloading, an attachment file of email, for example. The method of transmitting the new connection schedule performed between the management system 70 and the management system communication unit 101 can be switched among HTTP downloading, FTP downloading, and an email attachment file. The management system communication unit 101 receives the new connection schedule provided from the management system 70, and sends the new connection schedule 71 to the processing unit 102. The processing unit 102 overwrites the new connection schedule 71 on the connection schedule 104a stored in the storing unit 104. After that, at the time of confirming (monitoring) the schedule as described, the new connection schedule 71 is referred to so that a timing of making a connection to the management system 70 can be changed.

The partial schedule changing operation performed by the image processing apparatus 131 according to the second embodiment is basically same as that of the management mediating device 10 in the first embodiment described with reference to FIG. 6. Accordingly, an illustration of this operation is omitted. The operation from the time the management system communication unit 101 starts to make a connection at a timing defined in the connection schedule to the time the processing unit 102 reads a schedule changing command from the storing unit 104 is the same as in the case of an all schedule changing command. When the processing unit 102 determines that the command stored in the storing unit 104 indicates schedule adding, the processing unit 102 extracts a new unit schedule 41 attached to the schedule adding command, and adds the extracted unit schedule to the connection schedule 104a in the storing unit. In other words, the new unit schedule is added to the connection schedule 104a constituted by a group of unit schedules 41. After that, at the time of confirming (monitoring) the schedule as described, the changed connection schedule 104a is referred to so that a timing of making a connection to the management system 70 can be added.

On the other hand, when the processing unit 102 determines that the command stored in the storing unit 104 indicates schedule deleting, the processing unit 102 extracts an ID (identifier) of a deleting target unit schedule. This ID is attached to this schedule deleting command. The processing unit 102 finds a unit schedule 41 corresponding to the extracted ID, and deletes the found unit schedule 41 from the connection schedule 104a. In other words, a specific unit schedule 41 is deleted from the connection schedule 104a constituted by a group of unit schedules 41. After that, at the time of confirming the schedule as described, the changed connection schedule 104a is referred to so that a timing of making a connection to the management system 70 can be deleted.

According to the above-described all schedule changing process and partially schedule deleting process, the connection schedule 104a stored in the storing unit 104 of the image processing apparatus 131 can be appropriately changed in accordance with convenience for the management system 70. Accordingly, a connection to the management system 70 can be established at a timing desired by the management system 70 so that the management system 70 can issue a management command at an appropriate timing.

An operation in which the image processing apparatus 131 reads the schedule, and provides the schedule to the management system 70 is basically same as that of the management mediating device 10 in the first embodiment. Accordingly, an illustration of this operation is omitted. When the management system 70 knows the connection schedule 104a stored in the storing unit 104 in advance, the contents of the connection schedule 104a are useful for determining how to change the connection schedule. For this reason, in the operation of FIG. 7, in response to a request from the management system 70, the connection schedule 104a in the storing unit 104 is provided to the management system 70.

As described, when the management system communication unit 101 establishes a connection to the management system 70 at a timing defined in the connection schedule 4a, a schedule requiring command is issued from the management system 70. This schedule requiring command is received by the management system communication unit 101, and is stored in the storing unit 104. Thereafter, when the processing unit 102 reads the schedule requiring command from the storing unit 104, the processing unit 102 reads a current connection schedule 104a from the storing unit 104. Then, the read current connection schedule 104a is transmitted to the management system 70 by the management system communication unit 101. At this time, a method of transmitting the connection schedule 104a to the management system 70 may be a method of transmitting a response to the command such that the connection schedule 104a is included in the response, or a method of transmitting the connection schedule 104a as an attachment file of email of which destination is the management system 70. Accordingly, the management system 70 can review adding or deleting of a unit schedule.

The present invention is not limited to the above-described embodiments, and various modification and change can be embodied without departing from a scope of the present invention.

This patent application is based on Japanese priority patent application No. 2002-276574, 2003-084669, and 2003-320288 filed on Sep. 24, 2002, Mar. 26, 2003, and Sep. 11, 2003, respectively, the entire contents of which are hereby incorporated by reference.

What is claimed is:

1. A management mediating device, comprising:
   a management system communication unit making a connection to a management system outside a fire wall from inside the fire wall, and receiving a command from the management system;
   a storage unit storing a connection schedule of the management system communication unit inside the firewall to make the connection to the management system outside the firewall;
   an instructing unit that, in accordance with the connection schedule, instructs the management system communication unit to start a connection operation to make the connection to the management system, wherein after the management system communication unit makes the connection to the management system, and transmits a command check to the management system, the management system communication unit receives the command from the management system in response to the transmitted command check; and
   a processor performing a process in accordance with the received command, the process including to send a test signal to a hardware resource of an image forming apparatus to obtain data indicating a usage state of the image forming apparatus in a local area, the data indicating the usage state including information in response to the test signal from the hardware resource;
   the management system communication unit transferring the obtained data to the management system at a time the connection schedule indicates to connect to the management system.

2. The management mediating device according to claim 1, wherein in accordance with the connection schedule, the instructing unit provides to the management system communication unit at least one of:
   1) an instruction of making a connection to the management system at a specified date and time;
   2) an instruction of making a connection to the management system at a specified time every day;
   3) an instruction of making a connection to the management system at a specified date and time every month;
   4) an instruction of making a connection to the management system in a specified period at intervals of a specified value;
   5) an instruction of making a connection to the management system in a specified period at intervals of a specified value every day; and
   6) an instruction of making a connection to the management system from a specified date and time at intervals of a specified value for an indefinite period.

3. The management mediating device according to claim 1, wherein the connection schedule includes a start date and time, an end date and time, and a value of an interval, and in accordance with the connection schedule, the instructing unit provides to the management system at least one of:
   1) when only the start date and time is specified, an instruction of making a connection to the management system at the specified start date and time;
   2) when only a start time of the start date and time is specified, an instruction of making a connection to the management system at the start time every day;
   3) when only the start date and time is specified, and a month of the start date and time is not specified, an instruction of making a connection to the management system at the start date and time every month;
   4) when all of the start date and time, the end date and time, and the value of the interval, are specified, an instruction of making a connection to the management system from the start date and time to the end date and time at intervals of the value;
   5) when all of the start date and time, the end date and time, and the value of the interval are specified, and only the start time and the end time of the start date and time and the end date and time are specified, an instruction of making a connection to the management system from the start time to the end time at intervals of the value every day; and
   6) when the start date and time and the value of the interval are specified, and the end date and time is not specified, an instruction of making a connection to the management system from the start date and time for an indefinite period.

4. The management mediating device according to claim 1, wherein the processor has a schedule changing function of changing the connection schedule stored in the storing unit in accordance with the command.

5. The management mediating device according to claim 4, wherein when the command includes a schedule adding command, the processor adds an additional connection schedule to the connection schedule stored in the storing unit, the additional connection schedule being attached to the schedule adding command.

6. The management mediating device according to claim 4, wherein the connection schedule is constituted by a plurality of unit schedules, and an identifier is attached to each of the unit schedule,
   when the command includes a schedule deleting command, the processor searches the storing unit to find the unit schedule corresponding to the identifier attached to the schedule deleting command, and deletes the found unit schedule.

7. The management mediating device according to claim 4, wherein the command is an all schedule changing command, the processor extracts an Internet address attached to the all schedule changing command, causes the management system communication unit to obtain a new connection schedule existing at the Internet address, and replaces the connection schedule stored in the storing unit with the new connection schedule.

8. The management mediating device according to claim 4, wherein when the command includes a schedule requiring command, the processor reads the connection schedule from the storing means, and causes the management system communication unit to provide the connection schedule to the management system.

9. The management mediating device according to claim 1, wherein the management system communication unit has a SOAP processor function of making communication with the management system based on SOAP.

10. A computer readable storing medium that stores a management mediating program that is used at a management mediating device, wherein the management mediating device includes a first communication unit, a processor, a second communication unit, a storage unit that stores a connection schedule for the management mediating device inside the firewall to make a connection to a management system outside the firewall, and an instructing unit, the management mediating program comprising:

a first communication program code that causes the first communication unit to make the connection to the management system via the Internet, and to receive a command from the management system, wherein the management mediating device is positioned at an inside of a fire wall, and the management system is positioned at an outside of the fire wall;

an instructing program code that, in accordance with the connection schedule, instructs the management system communication unit to start a connection operation to make the connection to the management system, wherein after the management system communication unit makes the connection to the management system and transmits a command check to the management system, the management system communication unit receives the command from the management system in response to the transmitted command check;

a processing program code that causes the processor to perform a process in accordance with the command, the process including to send a test signal to a hardware resource of an image forming apparatus to obtain data indicating a usage state of the image forming apparatus in a local area, the data indicating the usage state including information in response to the test signal from the hardware resource; and a second communication program code that causes the second communication unit to transfer the obtained data to the management system at a time the connection schedule indicates to connect to the management system.

11. An image processing apparatus that comprises a hardware resource including at least one of a displaying unit, a printing unit, a scanner unit, a facsimile unit, a hard disk, an imaging unit and a network interface, and provides a service including at least one of a printing service, a copying service, and a facsimile service, the image processing apparatus further comprising:

at least one application that performs a particular process for the service;

a management system communication unit making a connection to a management system from an inside of a fire wall, and receiving a command from the management system positioned at an outside of the fire wall, and to transmit data to the management system;

a storage unit storing a connection schedule of the management system communication unit inside the firewall to make the connection to the management system outside the firewall;

an instructing unit that, in accordance with the connection schedule, instructs the management system communication unit to start a connection operation to make the connection to the management system, wherein after the management system communication unit makes the connection to the management system and transmits a command check to the management system, the management system communication unit receives the command from the management system in response to the transmitted command check;

a processor performing a process in accordance with the command, the process including to send a test signal to the hardware resource of the image processing apparatus to obtain data indicating a usage state of an image forming apparatus in a local area, the data indicating the usage state including information in response to the test signal from the hardware resource;

the management system communication unit transferring the obtained data to the management system at a time the connection schedule indicates to connect to the management system.

12. The image processing apparatus according to claim 11, wherein in accordance with the connection schedule, the instructing unit provides to the management system communication unit at least one of:

1) an instruction of making a connection to the management system at a specified date and time;
2) an instruction of making a connection to the management system at a specified time every day;
3) an instruction of making a connection to the management system at a specified date and time every month;
4) an instruction of making a connection to the management system in a specified period at intervals of a specified value;
5) an instruction of making a connection to the management system in a specified period at intervals of a specified value every day; and
6) an instruction of making a connection to the management system from a specified date and time at intervals of a specified value for an indefinite period.

13. The image processing apparatus according to claim 11, wherein the connection schedule includes a start date and time, an end date and time, and a value of an interval, and in accordance with the connection schedule, the instructing unit provides to the management system at least one of:

1) when only the start date and time is specified, an instruction of making a connection to the management system at the specified start date and time;
2) when only a start time of the start date and time is specified, an instruction of making a connection to the management system at the start time every day;
3) when only the start date and time is specified, and a month of the start date and time is not specified, an instruction of making a connection to the management system at the start date and time every month;
4) when all of the start date and time, the end date and time, and the value of the interval, are specified, an instruction of making a connection to the management system from the start date and time to the end date and time at intervals of the value;
5) when all of the start date and time, the end date and time, and the value of the interval are specified, and only the start time and the end time of the start date and time and the end date and time are specified, an instruction of making a connection to the management system from the start time to the end time at intervals of the value every day; and
6) when the start date and time and the value of the interval are specified, and the end date and time is not specified, an instruction of making a connection to the management system from the start date and time for an indefinite period.

14. The image processing apparatus according to claim 11, wherein the processing has a schedule changing function of changing the connection schedule stored in the storing unit in accordance with the command.

15. The image processing apparatus according to claim 14, wherein when the command includes a schedule adding command, the processor adds an additional connection schedule to the connection schedule stored in the storing unit, the additional connection schedule being attached to the schedule adding command.

16. The image processing apparatus according to claim 14, wherein the connection schedule is constituted by a plurality of unit schedules, and an identifier is attached to each of the unit schedule, when the command includes a schedule deleting command, the processor searches the storing unit to find the unit schedule corresponding to the identifier attached to the schedule deleting command, and deletes the found unit schedule.

17. The image processing apparatus according to claim 14, wherein the command includes an all schedule changing command, the processor extracts an Internet address attached to the all schedule changing command, causes the management system communication unit to obtain a new connection schedule existing at the Internet address, and replaces the connection schedule stored in the storing unit with the new connection schedule.

18. The image processing apparatus according to claim 14, wherein when the command includes a schedule requiring command, the processor reads the connection schedule from the storing means, and causes the management system communication unit to provide the connection schedule to the management system.

19. The image processing apparatus according to claim 11, wherein the management system communication unit has a SOAP processing function of making communication with the management system based on SOAP.

20. A remote management system in which a management object system is managed by communication between a management system and a management mediating device, wherein the management mediating device comprises:
a management system communication unit making a connection to the management system outside a fire wall from inside the fire wall, and receiving a command from the management system;
a storage unit storing a connection schedule of the management system communication unit inside the firewall to make the connection to the management system outside the firewall;
an instructing unit that, in accordance with the connection schedule, instructs the management system communication unit to start a connection operation to make the connection to the management system, wherein after the management system communication unit makes the connection to the management system and transmits a command check to the management system, the management system communication unit receives the command from the management system in response to the transmitted command check; and
a processor performing a process in accordance with the received command, the process including to send a test signal to a hardware resource of an image forming apparatus to obtain data indicating a usage state of the image forming apparatus in a local area, the data indicating the usage state including information in response to the test signal from the hardware resource;
the management system communication unit transferring the obtained data to the management system at a time the connection schedule indicates to connect to the management system;
and wherein the processor changes the connection schedule stored in the storage unit in accordance with a schedule changing command received from the management system.

21. A remote management method of managing a management object system by communication between a management mediating device and a management system, the method comprising:
a) the management mediating device making a connection, via the Internet, from inside a fire wall to the management system outside the fire wall, the connection being made based on a stored connection schedule in the management mediating device inside the firewall;
b) after the management mediating device makes the connection to the management system, in accordance with the connection schedule, and transmits a command check to the management system, receiving a command from the management system by using the connection in response to the transmitted command check;
c) performing a process in accordance with the command to send a test signal to a hardware resource of an image forming apparatus to obtain data indicating a usage state of the image forming apparatus in a local area, the data indicating the usage state including information in response to the test signal from the hardware resource;
d) transferring the obtained data to the management system at a time the connection schedule indicates to connect to the management system; and
e) when the command is a schedule changing command, changing the stored connection schedule in accordance with the schedule changing command.

* * * * *